United States Patent Office

3,519,421
Patented July 7, 1970

---

3,519,421
ELECTROPHOTOGRAPHIC RECORDING MATERIAL
James K. J. Cheng, Vestal, N.Y., assignor to GAF Corporation, New York, N.Y., a corporation of Delaware
No Drawing. Filed Sept. 26, 1967, Ser. No. 670,750
Int. Cl. G03g 5/08
U.S. Cl. 96—1.8     4 Claims

ABSTRACT OF THE DISCLOSURE

Electrophotographic recording material having a relatively electroconductive base and a coating thereon of photoconductive zinc oxide pigment in an insulating binder containing 40 to 70% of a vinyl acetate-N-vinyl-pyrrolidone copolymer, 10 to 50% of a p-tertiarybutyl benzoylated glycerine-phthalic acid alkyd resin, and optionally, up to 50% of a higher unsaturated fatty acylate glycidyl-bisphenol-A polyether epoxy resin, a silicone modified styrenated drying oil resin or a styrene acrylic ester copolymer resin.

---

This invention relates to sheet material for electrophotographic recording and a method for its preparation.

More particularly, the invention relates to such sheet material having, on a relatively conductive base or supporting sheet, a photoconductive insulating coating consisting of photoconductive zinc oxide particles suspended in an electro insulating binder.

Such materials are disclosed for example, in U.S. Pat. 3,052,540, wherein photoconductive white zinc oxide pigment, which is itself sensitive primarily to light in the near ultra-violet region, is sensitized to visible light by adsorption thereon of authorized organic dyestuffs, especially those of the xanthene, triarylmethane, thiazol, thiazine, azine, acridine, diphenylmethane, cyanine and anthroquinone series. Such dyestuffs are applied to the zinc oxide in a volatile solvent such as methanol or ethanol, either before combining the pigment with a binder or by addition to a dispersion of the pigment in a binder solution. The zinc oxide pigment is mixed with a solution in a volatile organic solvent of an electro insulating film binder which may be a synthetic resin such as a vinyl, silicone, or phenol-formaldehyde resins, a cellulose ester or ethers, or shellac. The suspension is then coated on a relatively conductive backing and dried.

As a backing or support there may be appropriately used, paper which may include as an impregnant, a component which increases its electroconductivity—e.g., salts such as sodium chloride or potassium chloride, or ionic resins such as the vinylbenzyl quaternary ammonium polymers disclosed in U.S. Pat. 3,011,918.

As disclosed, for example, in U.S. Pat. 3,052,539, the resulting electrophotographic recording material is charged in the dark by exposing its pigment-coated surface to a charging device such as an arrangement of fine wires connected to a high-voltage DC source while the paper base is supported on a grounded metal plate. The pigment-coated surface, bearing a uniform electrostatic charge, is then exposed image-wise to light (e.g., by projection) whereby the light-exposed areas are rendered conductive, and their electrostatic charge is withdrawn through the conductive base and the grounded support, to yield a residual electrostatic charge pattern constituting a latent image of the projected subject matter. The image is then developed by application of a colored powder with an opposite charge, which adheres to the charged areas of the latent image. The powder may be dusted on the image-bearing surface or applied in suspension from non-conductive liquid, the excess powder being removed to yield a positive image of the projected subject matter. If a powder is used having the same charge as electrostatic image, it is repelled thereby and adheres instead to the remaining areas to provide a negative image of the projected subject matter. The powder is preferably fusible so that it may be caused to adhere permanently to the recording sheet by temporarily heating (e.g., with infrared radiation).

A disadvantage commonly encountered in electrophotographic recording materials of the aforesaid type lies in their tendency to deteriorate under atmospheric storage conditions, whereby the rate of dark decay (i.e., the rate of fading out of the electrostatic latent image in the dark) increases, and the resulting visible image is of decreased density.

It is an object of this invention to provide electrophotographic recording material of excellent moisture resistance even at 80% relative humidity which provides latent images of good dark decay characteristic, providing excellent image density on development—such characteristics being retained over long periods of storage so as to yield consistent copying results.

In accordance with this invention, improved electrophotographic recording material is produced by utilizing, as a binder for the electroconductive zinc oxide pigment, a mixture of resins consisting of 40 to 70% by weight of a copolymer of 85 to 95% vinyl acetate with 5 to 15% of N-vinyl-pyrrolidone, and a modified alkyd resin of the type disclosed in U.S. Pat. 2,734,876 which is a p-tertiarybutyl benzoylated phthalic acid-glycerine resin, preferably further modified by esterification with a higher unsaturated fatty acid such as oleic, ricinoleic or talloil fatty acid amounting to 10 to 50% by weight of the mixture; other resin components of the mixture (if any) being epoxy resins of the type disclosed in U.S. Pat. 2,970,983—especially glycidyl polyethers of 4,4'-bis-hydroxyphenyl-dimethylmethane, esterified with higher fatty acids such as linseed fatty acid or its dimer or soya fatty acid, silicone-modified styrenated drying oils such as tung oil, and copolymers of styrene with acrylic esters such as alkyl acrylates or methacrylates in which the alkyl group may contain from 1 to 18 carbon atoms.

Such resin mixtures are dissolved in volatile organic solvents, especially aromatic hydrocarbons such as benzene, toluene or xylene, alone or mixed with lower aliphatic esters such as ethylacetate, in such amounts as to provide a resin concentration of 10 to 20% by weight. The resin solution is mixed with photoconductive zinc oxide such that the weight ratio of pigment to resin is from 8:1 to 12:1, the percent solids being preferably about 45 to 55% by weight to yield a suspension suitable for application by coating on relatively conductive sheet material serving as a base, the mixture being thoroughly milled to produce a uniform suspension. Sensitizing dyes for the zinc oxide can be added in methanol or ethanol solution—the amount of sensitizing dye being advantageously about 10 to 20 mg. per 100 g. of zinc oxide.

The mixture is then coated on a suitable conductive base paper containing a salt or an ionic resin of the type mentioned above, and the coating dried—the coating rate being adjusted preferably to yield, on drying, 10 to 20 lbs. per 3,000 sq. ft.

The resulting electrophotographic recording material yields images in electrophotographic copiers such as the SCM 44 or Bruning Copytron 2000 machines of excellent density—the material remaining stable after as much as twelve months' aging under normal atmospheric storage conditions so as to yield images of substantially undiminished quality at the end of the aging period.

My invention is illustrated, but not limited to, the following examples, wherein parts, percentages and proportions are by weight unless otherwise indicated:

EXAMPLE 1

101 g. of a 55% solution of a 90% polyvinyl acetate—10% N-vinyl-pyrrolidone copolymer in a mixture of equal quantities of toluene and ethylacetate were mixed with 48.5 g. of a 48.9% solution in xylene of a glycerine (20%)-isophthalic acid (55%) alkyd resin esterified with ricinoleic acid (15%) and p-tertiary-butyl benzoic acid (10%). The mixture was diluted with 198 g. of toluene and 198 g. of ethylacetate, the ratio of the two resins in the resulting solution being 70:30, and the resin concentration about 15%. 630 g. of a photoconductive white zinc oxide pigment (Azo 222–661, supplied by American Zinc Company) were added to the resin solution and the mixture agitated in a Waring Blendor for 15 to 30 minutes to produce a homogenous mixture containing about 60% solids—the ratio of zinc oxide to resins being about 8:1. To this mixture were added 17 ml. of a methanol solution of sensitizing dyes, containing in each ml. the following dyes in the indicated amounts, the dye being identified by the numbers assigned thereto in Color Index, 2nd Edition, 1957, or in the literature:

| Dyes: | Quantity, mg. |
| --- | --- |
| Fluorescein (C.I. No. 45350) | 1.43 |
| Eosin (C.I. No. 45380) | 0.38 |
| Rose bengal (C.I. No. 45440) | 0.38 |
| Patent blue (C.I. No. 42045) | 1.37 |
| Bromphenol blue (JACS vol. 41, p. 1205, vol. 50, p. 2017; Beilstein vol. 19, 1st suppl. p. 649, 2nd suppl. p. 105) | 0.23 |

The mixture was once more agitated to effect uniform distribution of the dyes and then diluted with 255 g. of toluene to reduce the solids content to about 49%, affording a viscosity suitable for coating. The mixture was then coated—using a wire-wound bar—on a paper containing on each side about 2 lbs. per 3,000 sq. ft. of polymerized vinylbenzyltrimethylammonium chloride, serving as a conductivity increasing ionic resin at such rate as to yield a coating, when dry, of 15 lbs. per 3,000 sq. ft. The coating was dried at about 130° F.

Paper resulting from the foregoing procedure yielded electrophotographic images of excellent density in copiers such as the SCM 44 and Bruning Copytron 2000 machines, and remained stable after about five months' storage under normal atmospheric conditions, yielding images of substantially the same quality as when freshly prepared.

EXAMPLE 2

To 57.5 g. of the same 55% solution of polyvinyl-acetate-N-vinyl-pyrrolidone copolymer employed in Example 1, were added 16.2 g. of the 48.9% xylene solution of the modified glycerine-isophthalic acid resin of Example 1, together with 60.8 g. of a 65% toluene solution of silicone-modified styrene-tung oil copolymer resin. The mixture was diluted with 336 g. of toluene and 62.5 g. of ethylacetate. The weight ratio of the three resins, respectively, in the resulting solution was 40:10:50—the resin concentration being about 14.8%. 630 g. of the photoconductive zinc oxide pigment employed in Example 1 were then added, and the slurry agitated in a Waring Blendor for 15 to 30 minutes. The resulting dispersion contained 57% solids, the ratio of zinc oxide to resin being about 8:1. To this mixture were added 17 ml. of the sensitizing dye solution of Example 1, and after agitating to distribute the dyes uniformly, the mixture was diluted to 48% solids concentration by addition of 235 g. of toluene. When coated on the conductive paper base used in Example 1, at such rate as to produce a coating of about the same weight as in said Example, and drying, the resulting electrophotographic recording material yielded electrophotographic images of excellent density, and had storage stability comparable with that of the material produced in the first example.

EXAMPLE 3

To 57.3 g. of the 55% solution of polyvinylacetate-N-vinylpyrrolidone copolymer used in Example 1 were added 16.7 g. of the 48.9% solution of the glycerine-isophthalic acid alkyd resin of Example 1, together with 46.6 g. of a 50% toluene solution of a styrene-methyl-methacrylate copolymer resin, and the mixture diluted with 337.9 g. of toluene and 62.5 g. of ethylacetate to yield a solution in which the three resins were present in a ratio of 50:13:37, the resin concentration being about 13%. To this solution were added 630 g. of the photoconductive white zinc oxide pigment used in the first example, and the mixture homogenized as before in a Waring Blendor. The ratio of zinc oxide to resin was about 10:1 and the mixture contained about 60% solids. 6.3 ml. of a methanol solution of the following sensitizing dyes were added, containing in each ml. the following dyes in the indicated amounts:

| Dye: | Quantity, mg. |
| --- | --- |
| Fluroescein | 3.60 |
| Eosin | 0.98 |
| Rose bengal | 0.98 |
| Patent blue | 3.41 |
| Bromphenol blue | 0.56 | the mixture was again agitated to distribute the dyes uniformly, and then diluted with 230 g. of toluene to reduce the solids content to 50%. The mixture was coated on a conductive paper base as in Example 1, and dried. The resulting product possessed excellent electrophotographic image-forming properties comparable with those of the products of the preceding examples, as well as showing similar stability after five months' storage under atmospheric conditions.

EXAMPLE 4

To 45.8 g. of the 55% solution of vinylacetate-N-vinylpyrrolidone copolymer used in Example 1, were added 19.3 g. of the 48.9% solution of glycerine-isophthalic acid alkyd resin of said example, together with 56.7 g. of a 50% toluene solution of polyglycidyl-bisphenol A ether resin, esterified with dimerized linseed fatty acid and soybean fatty acid, and the mixture then diluted with 335.7 g. of toluene and 62.5 g. of ethylacetate, to yield a solution containing about 13% resins. The three resins were present respectively in a ratio of about 40:15:45. 630 g. of the photoconductive white zinc oxide pigment of Example 1 were added, and the slurry homogenized for 15 to 30 minutes in a Waring Blendor. The solids content of the mixture amounted to about 60%, the ratio of zinc oxide to resin being about 10:1. 6.3 ml. of the sensitizing dye solution of Example 3 were then added, and agitation resumed to distribute the dyes uniformly. The mixture was then diluted with 360 g. of toluene, reducing the solids content to about 46%. After coating on the conductive base paper and drying as in Example 1, the resulting paper was found to have excellent electrophotographic properties, and to retain its quality after storage under normal atmospheric conditions for a period of twelve months, as in the preceding examples.

Instead of the vinylacetate-N-vinylpyrrolidone copolymer of the examples, there can be substituted similar copolymers containing the same monomer components in other proportions ranging from 85 to 95% vinylacetate and from 5 to 15% N-vinylpyrrolidone.

Similarly, instead of the alkyd resin of the examples, there can be used other phthalic (i.e., orthophthalic, isophthalic or terephthalic) acidglycerol alkyd resins, modified by esterification with p-tertiarybutyl benzoic acid and higher unsaturated fatty acids such as ricinoleic, linoleic or the fatty acids of tung oil, talloil and the like, as described in U.S. Pat. 2,734,876.

Instead of the silicone-modified styrene-tung oil copolymer of Example 2, there can be used other silicone-modified styrene copolymers with other drying oils such as perilla oil, linseed oil, oiticica oil and the like; and instead of the styrene-acrylic ester copolymer of Example 3, there can be substituted styrene copolymers with other acrylic or methacrylic acid alkyl esters in which the alkyl group contains from 1 to 18 carbon atoms.

For the epoxy resin of Example 4, there can be substituted other glycidyl polyethers of bisphenol A (i.e., of 4,4'-bishydroxyphenyl-dimethylmethane) modified by esterification with other higher unsaturated fatty acids such as those of tung oil, epoxidized linseed oil, rape seed oil and the like—being resins of the type disclosed in U.S. Pat. 2,970,983.

The relative proportions of vinylacetate-N-vinylpyrrolidone copolymer and the aforesaid alkyd resins can be varied respectively from 40 to 70% and from 10 to 50% of the resin mixture, the remainder being one or more of the styrene copolymer resins or epoxy resins mentioned above—the proportion of the latter resins ranging up to 50% of the resin mixture.

The solvents used can be other inert volatile organic liquids which are solvents for the resins employed—preferably liquid aromatic hydrocarbons such as benzene, toluene, or xylene which can be mixed with up to 50% of lower aliphatic carboxy acid alkyl esters such as ethylacetate, methyl propionate, butylacetate and the like. The resins are advantageously present in the solution in a concentration from 10 to 20%.

The photoconductive zinc oxide pigments can be used without dye-sensitization, but are preferably sensitized with dyestuffs such as those disclosed in U.S. Pat. 3,052,540 and U.S. Pat. 3,203,795—suitable proportions of the dyestuffs being 10 to 50 mg. per 100 g. of zinc oxide. The quantity of zinc oxide added to the resin solution ranges suitably from a ratio of 8:1 to 12:1, based on the amount of resin contained in the solution. In order to provide viscosity suitable for coating the proportion of solids contained in the coating mixture, i.e., the proportion of zinc oxide pigment and resins may be advantageously adjusted by addition of volatile solvent to 45 to 56%.

Instead of the paper base employed in the examples, other relatively conductive papers may be used which contain other ionic resins of the type containing quaternary ammonium radicals, or comparable quantities of readily ionizable inorganic salts such as NaCl, KCl or $MgCl_2$. The zinc oxide coating composition is suitably applied to the paper base in such amounts as to yield, when dried, a coating of zinc oxide and resin of 10 to 20 lbs. per 3,000 sq. ft.

Other variations which will be obvious to those skilled in the art can be made in the electrophotographic materials of my invention without departing from the scope or spirit thereof.

I claim:
1. Electrophotographic recording material having a relatively conductive base, and a coating thereon containing a photoconductive zinc oxide pigment, and an insulating binder therefor consisting essentially of 40 to 70% by weight of a vinyl acetate-N-vinyl-pyrrolidone copolymer resin wherein the weight ratio of the aforesaid monomer components ranges from 85:15 to 95:5, 10 to 50% by weight of a phthalic acid-glycerol alkyd resin modified by esterification with p-tertiarybutyl benzoic acid and a higher unsaturated fatty acid, and up to 50% of a resin selected from the group consisting of silicone-modified styrene-drying oil copolymers, styrene-alkyl-acrylate copolymers in which the alkyl group contains 1 to 18 carbon atoms, styrene methacrylate copolymers, and glycidyl polyethers of 4,4'-bishydroxyphenyl dimethylmethane epoxy resins esterified with a higher unsaturated fatty acid, the weight ratio of zinc oxide pigment to resin being from 8:1 to 12:1.

2. Electrophotographic recording material, according to claim 1, wherein the zinc oxide is sensitized with optically sensitizing dyes, the amount of which ranges from 10 to 50 mg. per 100 g. of zinc oxide.

3. Electrophotographic recording material according to claim 1, wherein the base is paper containing, as an electroconductive component, a polymer of a vinylbenzyl quaternary ammonium salt.

4. Electrophotographic recording material according to claim 1, wherein the base is paper containing an easily-ionizable inorganic salt.

References Cited

UNITED STATES PATENTS

| | | | |
|---|---|---|---|
| 3,116,147 | 12/1963 | Uber et al. | 96—1.8 |
| 3,127,332 | 3/1964 | Bonrud | 96—1.8 X |
| 3,132,941 | 5/1964 | Stahly et al. | 96—1.8 |
| 3,347,670 | 10/1967 | Nelson et al. | 96—1.5 |
| 3,401,037 | 9/1968 | Roteman et al. | 96—1.8 X |
| 3,437,481 | 4/1969 | Graver et al. | 96—1.8 |
| 3,447,957 | 6/1969 | Behringer | 96—1.8 X |

DONALD LEVY, Primary Examiner

C. E. VAN HORN, Assistant Examiner

U.S. Cl. X.R.

96—1.7; 260—22